United States Patent
Draim

[15] 3,647,161
[45] Mar. 7, 1972

[54] PLUG NOZZLE ATTITUDE CONTROL DEVICE

[72] Inventor: John E. Draim, 9310 Telfer Ct., Vienna, Va. 22180

[22] Filed: July 18, 1969

[21] Appl. No.: 842,940

[52] U.S. Cl. ................................................. 244/3.2, 60/229
[51] Int. Cl. ..................... F41g 7/12, F42b 19/08, F02k 1/08
[58] Field of Search ...................... 244/3.2; 60/229, 230, 232

[56] References Cited
UNITED STATES PATENTS

| | | | |
|---|---|---|---|
| 2,981,061 | 5/1961 | Lilligren | 60/229 |
| 3,304,029 | 2/1967 | Ludtke | 244/3.20 |

Primary Examiner—Benjamin A. Borchelt
Assistant Examiner—J. J. Devitt
Attorney—R. I. Tompkins, L. I. Shrago and C. E. Vautrain, Jr.

[57] ABSTRACT

The disclosure relates to the use of a spinning plug nozzle to provide an attitude reference means of which flow of fluid may be controlled to provide a righting moment in rockets and marine vehicles.

8 Claims, 10 Drawing Figures

INVENTOR.
JOHN E. DRAIM

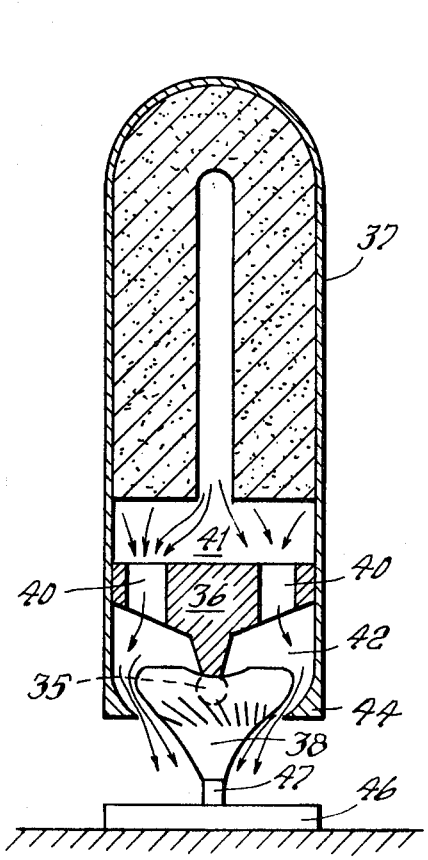
Fig. 2
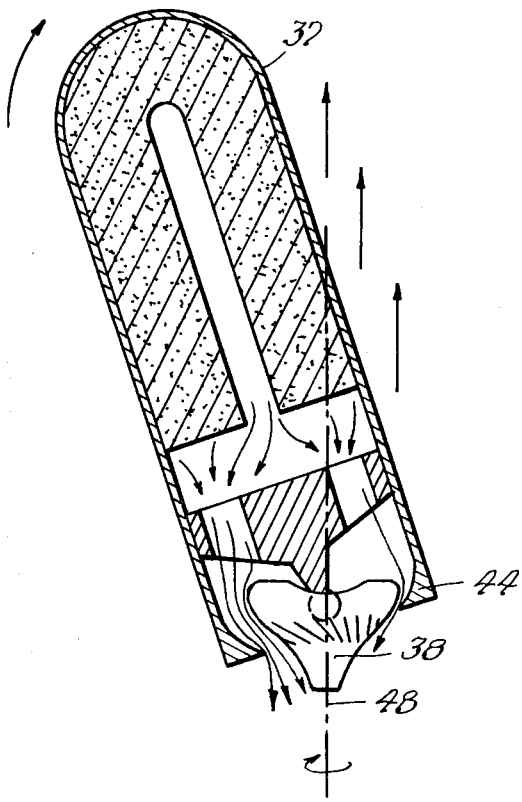
Fig. 3
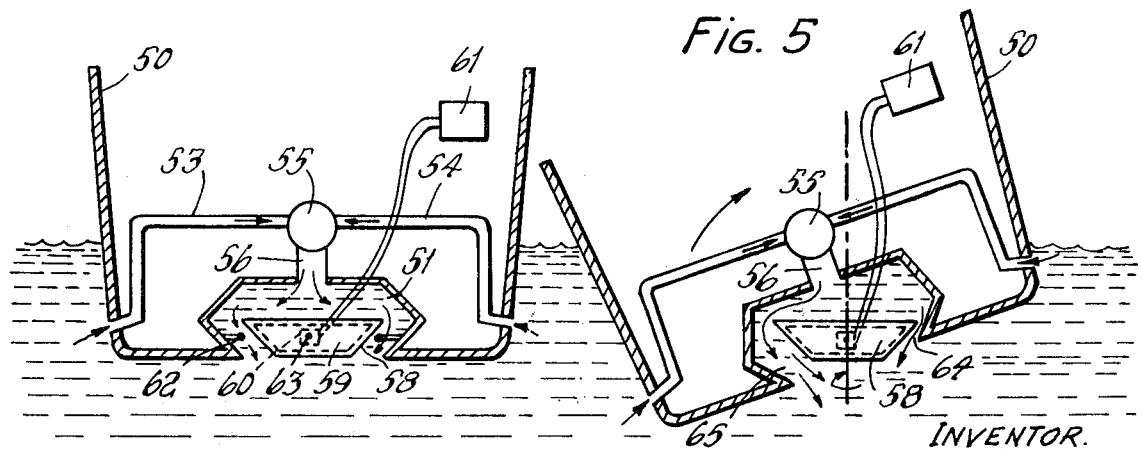
Fig. 4
Fig. 5
INVENTOR.
JOHN E. DRAIM

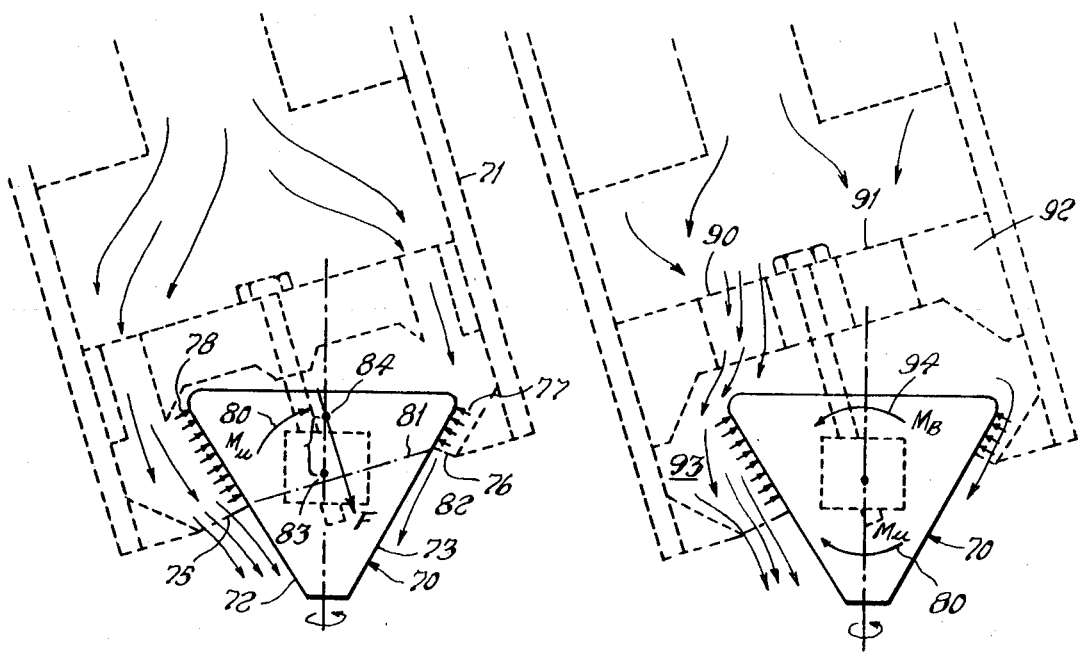
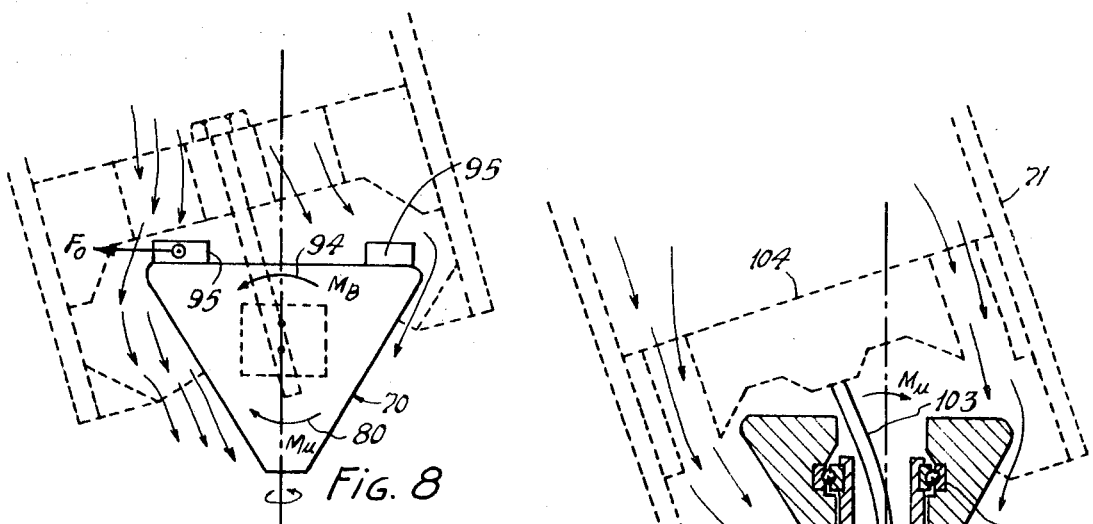
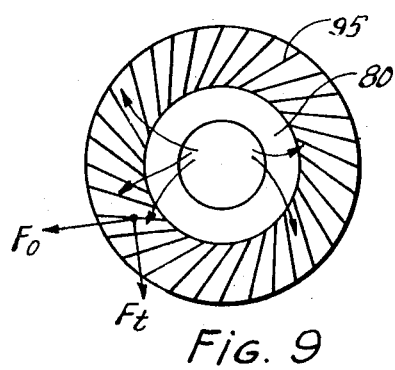
FIG. 6
FIG. 7
FIG. 8
FIG. 9
FIG. 10
INVENTOR.
JOHN E. DRAIM

PLUG NOZZLE ATTITUDE CONTROL DEVICE

The invention described herein may be manufactured and used by or for The Government of the United States of America for governmental purposes without the payment of any royalties thereon or therefor.

The invention concerns means for automatically providing a righting moment for rocket and marine vehicles and, more particularly, such means wherein a gyro-type device provides a reference for determining and forming the corrective forces.

There are numerous situations in both military and scientific rocketry in which it is desired to maintain a rocket along a fixed or substantially fixed axis during firing. Examples of these situations are bombardment-type rockets, scientific probe-type rockets and upper stages of orbital boosters. In the first and third examples, it is often the practice to spin up the entire rocket by auxiliary means around a reference axis. In the second example, it is frequently necessary to use a very high launch tower to guide the rocket during its first few seconds of flight. Such guidance is necessary in order to overcome large tip-off angles due to wind and resulting excessive impact dispersion patterns. These problems of rocket stability are also applicable to surface or underwater marine vehicles since a vessel rolling in a sea is in an instability mode similar to that of a rocket during early launch stages.

Some of the major problems presented by prior stabilizing devices are solved by the use of a means for establishing a spin reference axis and for correcting the attitude of the rocket casing so that it is continuously aligned with the spin reference axis. In the present invention, this solution is accomplished by means of rotatable plug nozzles. Although in the prior art stationary plug nozzles have been tried and even though they have been found to be of comparable efficiency over a wide range of exhaust pressures to the conventional bell-type nozzles, they have not been put to general use. Further, a stationary nozzle provides no inherent stability.

The present invention thus replaces the prior stabilizing means for the type of rockets discussed above by a rotating plug-type nozzle whose operation is based on mechanical gyro theory. The plug portion of the nozzle constitutes the spinning mass of the conventional gyro, the plug portion being supported centrally so as to permit rotation about two orthogonal axes perpendicular to the rocket casing longitudinal axis. The plug is simultaneously permitted to rotate about its own axis of symmetry in order to act as a gyro. The plug may be supported by a single hemispherical bearing centrally located within the plug or, alternatively, the plug may be mounted on a universal joint with a conventional ball bearing surrounding the universal and permitting high rotational speeds. Plug spin up may be accomplished by any of several methods, the simplest of which is connecting the plug to a rotatable base shaft or other support member in a readily detachable manner. An alternative method would be to spin up the plug using the rocket exhaust itself, i.e., the exhaust being directed against vanes attached to the plug and extending upstream or downstream of the exhaust annulus. If desired, a combination of these methods may be used wherein the plug is spun up by independent mechanical means and is provided with vanes placed in the path of exhaust gas flow to augment spinning after the rocket has been launched. In the external spin up effort, an electric induction motor or air turbine could be used with the plug acting as rotor. In each of the above cases, the plug would be retained on an alignment shaft during spin up so as to maintain the desired spin axis.

Accordingly, it is an object of the present invention to provide improved means for stabilizing the attitude of floating craft and sounding and other relatively small rockets through concentrating the flow of a fluid so as to provide a righting moment.

Another object of the invention is to provide means for stabilizing the attitude of a vehicle by restricting some portions of a fluid thrust exit area and enlarging other portions to achieve stabilization.

A further object of the invention is to provide a rocket stabilizing means and method wherein gyroscopic forces provide a stabilized reference by means of which corrective thrust forces are directed.

Other objects, advantages and novel features of the invention will become apparent from the following detailed description thereof when considered in conjunction with the accompanying drawings in which like numerals represent like parts throughout and wherein:

FIG. 2 is a schematic view partly in section of an alternate embodiment of the invention;

FIG. 3 illustrates the operation of the embodiment of FIG. 2 in directing the flow of gases to correct launch instability;

FIG. 4 is a schematic view partly in section of an embodiment of the invention in use in a watercraft;

FIG. 5 is a schematic drawing of the embodiment of FIG. 4 illustrating the application of corrective forces to produce a righting moment in the craft;

FIG. 6 is a schematic diagram illustrating one means for correcting an upsetting force caused by the unbalanced exhaust gases;

FIG. 7 is a schematic diagram of an alternate means for providing a force for correcting an upsetting force caused by the unbalanced exhaust gases;

FIG. 8 is a schematic diagram of a further means for correcting an upsetting force caused by the unbalanced exhaust gases;

FIG. 9 is a plan view of the plug nozzle in the embodiment of FIG. 8; and

FIG. 10 is a schematic diagram of still another means for correcting the upsetting force.

Figure 1:
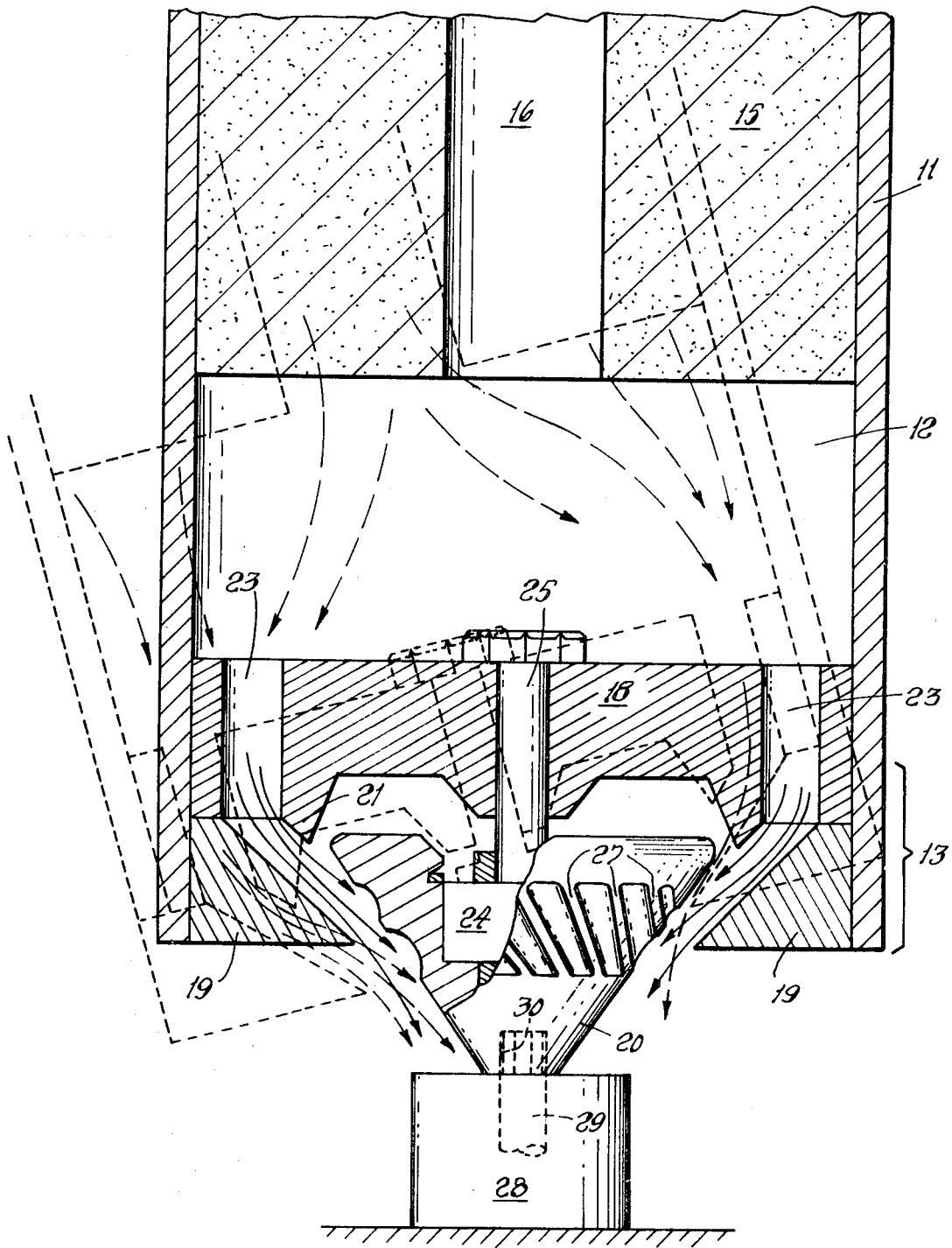
FIG. 1 is a schematic view partly in section of one embodiment of the invention.

Referring to FIG. 1, there is shown a rocket having a casing 11, a combustion area 12 and a nozzle area 13, the rocket being in this instance a solid propellant rocket in which the propellant indicated at 15 is cored at 16 to promote burning. The rocket is ignited by conventional igniting means, not shown, and is provided with additional structure in the nozzle area comprising a nozzle attachment insert and flow directing means 18 which is secured to the inner surface of the casing 11, a throat 19 and a nozzle 20 which is adapted to be spun up to a desired rotational velocity. Insert 18 is provided with a plurality of passages 23 of sufficient cross-sectional area to permit passage of the full flow of gases from combustion chamber 12. Passages 23 are positioned around the periphery of insert 18 and terminate in a depending portion 21 which in the normal attitude is spaced selectively from the throat 19 so that gases are diverted toward the longitudinal axis of the rocket as they pass along the side of the cone-shaped nozzle 20. Nozzle 20 is mounted on a spherical bearing, not shown, which is contained in a casing 24, the casing being secured to the nozzle and the bearing being secured to a shaft 25 which, in turn, is fixedly attached to insert 18. The bearing permits deflection of rocket body 11 with respect to nozzle 20 to a desired limit with respect to the longitudinal axis of rocket 11. Nozzle 20 also is provided with a plurality of vanes 27 which serve to maintain the rotational velocity of the nozzle after initial spin up which has been accomplished by means, not shown, in a base block 28. The spin-up means may be of conventional form such as gear driven or jet driven with conventional guide release means such as a hexagonal contoured shaft 29 over which nozzle 20 is positioned for support and alignment, the nozzle having an opening 30 which receives the head of shaft 29 with a very slight clearance between the two members.

FIGS. 2 and 3 illustrate an embodiment of the invention having an alternate plug configuration and plug suspension. A spherical bearing 35 depends from the nozzle-supporting insert 36 a sufficient distance to permit canting of the rocket casing 37 with respect to plug 38 to accommodate selected variation of the rocket casing from the reference axis. Passages 40 in insert 36 direct exhaust gases from combustion chamber 41 to the nozzle and throat area 42. Plug 38 is contoured opposite throat 44 of the rocket to permit substantially unimpeded flow of exhaust gases around the periphery of the plug under conditions where the longitudinal axis of the rocket casing is aligned with the spin axis of the plug. Under these conditions, exhaust gases flow substantially equally around the periphery of plug 38. Plug 38 before launch is held in the desired attitude by a base 46 having a shaft 47 thereon which is removably received in close fit in plug 38. Not shown are means associated with shaft 47 and base 46 imparting a desired high rotational velocity to plug 38 prior to launch. If desired, rocket casing 37 may be supported around the periphery of its base so that only a fraction of the weight of the rocket, propellant, etc., is carried by the alignment and spin-up means 47 and 46.

FIG. 3 depicts the attitude of rocket casing 37 shortly after launch under circumstances wherein the casing has been canted a considerable amount from the reference axis 48 of the spinning plug. In this condition, it may be noted that the tilting of rocket casing 37 with respect to plug 38 has caused a restriction in the passage between the right side of throat 44 and the adjacent surface of plug 38 and a commensurate widening of the passage between the left side of throat 44 and plug 38. The condition shown in FIG. 3 is, of course, instantaneous. As the rocket casing 37 departs from a position in alignment with axis 48, a narrowing of the passage on one side is immediately evidenced as is a widening of the passage on the opposite side. Thus, corrective exhaust forces are automatically brought into effect upon any deviation of the longitudinal axis of the rocket casing from the spin axis of the plug nozzle.

Application of the concept of the invention to surface watercraft is shown in FIGS. 4 and 5. FIG. 4 shows a ship 50 on an even keel and having disposed within its hull at one or more positions along the centerline thereof a plenum 51 which when the stabilizing means is operated is filled with water drawn from the environment through inlet pipes 53 and 54 by pump 55. Water is forced by pump 55 through outlet conduit 56 into plenum 51 thereby under stabilized conditions providing a uniform flow around plenum-based nozzle casing 58 back to the environment. The casing is stationary to avoid drag losses while within it a plug nozzle 59 is spun by conventional means such as an electric motor 60 connected to a power source 61. Casing 58 is mounted on gimbals having two orthogonal axes 62 and 63. In such an arrangement when the ship heels as shown in FIG. 5, the nozzle 58 in this embodiment may be continuously maintained in a spinning state. Flow past the nozzle is restricted by a narrow passage 64 on the starboard side. The flow of fluid is therefore much greater through the larger passage 65 on the port side causing a corrective force to be applied to the plenum chamber on that side which force will assist in righting the vessel much more rapidly than ordinarily would occur. The gimballed supports are not shown in FIG. 5 to more clearly illustrate the flow pattern when the ship is heeled at the angle shown. The gimbals, in any event, may be positioned at quadrants with respect to the fore and aft line of the ship so that in surface craft where 360° in corrective forces are not necessary or desired the corrective forces may be limited to those areas located substantially transverse to the longitudinal axis of the ship or craft.

FIG. 6 is a schematic diagram illustrating an unequal force introduced about the plug 70 of a rocket motor 71, the force being created by uneven distribution of pressure on the sides 72 and 73 of plug 70. The shock wave in supersonic rockets forms at the throat on each side of the plug as indicated at 75 and 76. Due to the greater exposure of side 72 to the gases, a greater force is exerted on that side as indicated by arrows 77 than on the opposing side as indicated by arrows 78. The greater force represented by arrows 78 produces an upsetting moment, $M_u$, which is indicated by arrow 80. This moment acts along a force line F which bisects the plane of shock wave 81. The force thus is exerted through an arm 82 and tends to tip the plug nozzle a significant amount. One means for opposing and canceling this moment is illustrated in FIG. 6 wherein the center of spin 83 of the nozzle is changed vertically to a point 84 on force line F thereby freeing the plug nozzle from the upsetting moment, $M_u$.

In FIG. 7, an alternate means for correcting the upsetting moment caused by unbalanced exhaust gases is shown which includes positioning the exhaust ducts 90 and 91 toward the center of nozzle attachment insert and flow directing means 92 so that the area of greatest flow which is indicated at 93 is so positioned as to cause exhaust gases to exert a greater force on the top surface of plug nozzle 70 on that side which force creates a torque, $M_b$, in the opposite direction 94 to that of the upsetting moment 80.

In FIG. 8, the moment correcting means of FIG. 7 is augmented by the addition of a plurality of vanes 95 disposed about the upper surface of plug nozzle 70. FIG. 9 shows the vanes 95 in a plan view with the force of the gases being divided into perpendicular force components $F_t$ and $F_o$. Force component $F_t$ provides a tangential force which tends to increase the spin velocity of nozzle 80 while $F_o$ provides the orbital force which acts through the arm between the center of the vanes and the center of spin of the nozzle to provide a balancing moment 80.

A further means for correcting or balancing the upsetting moment is shown in FIG. 10 wherein the plug nozzle 98 is supported in a bearing 99 which is adapted to permit the nozzle to pivot relative to its attached casing. Secured to the inner race of the bearing is a rigid cylinder wall 100 having a rigid base 101 secured thereto and a flexure rod 103 secured to base 101 by conventional means such as welding and to the nozzle insert 104 at the other end. The forces which tip the rocket casing 71 with respect to nozzle 98 cause flexure rod 103 to bend in the manner illustrated. Such bending creates an inherent balancing moment 105 which exists so long as rod 103 is bent. This rod may be relatively small in diameter in relation to the size of the plug nozzle since the upsetting moment and balancing moment are relatively small in magnitude.

In operation, if either the rocket casing or the vessel hull deviates from the reference or spinup axis of the plug nozzle, a modulation of the exhaust annulus occurs. Because of the geometry of the plug and its point of support, this modulation gives rise to a corrective moment about the vehicle C. G. In essence, the effective thrust vector is offset in the proper direction to correct the deviation. More particularly, as the rocket lifts off the alignment pin with the plug spinning rapidly, a deviation off the spin reference axis by the main rocket stage might occur as a result of wind shear or other upsetting force. The spinning plug, however, acting as a free gyro, tends to maintain its spatial orientation. As the rocket tips to one side as shown in FIG. 3, the throat-to-plug clearance increases on that side and is correspondingly reduced on the other side. The opening on the side of increased clearance permits a heavier flow to occur therethrough, and the resultant thrust vector is directed toward that side. A couple is generated around the main rocket C. G. which is usually 10 to 20 calibers distant. This resulting couple counters the movement of the main rocket body away from the vertical and forces it back towards alignment with the spin reference axis of the rotating plug. As the rocket again reaches alignment with the plug, the forces are neutralized normal to the rocket body since the annular area is equal around the periphery of the plug.

Jet damping may be provided by the jet flow itself or by conventional aerodynamic fins, now shown, which would be made much smaller than for a rocket not having the present invention installed therein. Amplification of the corrective forces is provided by the relatively close clearances between the plug and the adjacent throat surface.

It is noted that the present invention is particularly directed for use in rockets intended to travel or remain oriented in a straight line and for use in stabilizing watercraft. Once the plug has been set spinning about its axis which becomes a reference axis, it is not contemplated that the spin axis be altered. Consequently, the device is particularly applicable for probe-type rockets, for bombardment-type rockets, to reduce dispersion and for the upper stages of a multistage rocket. In the latter use, the first stage alignment pin would be rigidly mounted to the launch rail or tower. Then, at the nose of each stage, another alignment pin would be attached and inserted within a rotatable plug which is mounted in the throat area of the succeeding stage. As each succeeding stage is fired, its reference axis is that of the preceding stage which has been stabilized by its rotatable plug. It will be appreciated that the present invention provides a very much simplified way of maintaining rocket attitude in flight or ship stability in a seaway. These results are accomplished without resorting to complicated and expensive servo and feedback loops including electronic-electrical subsystems. The invention may replace or substantially reduce in size conventional, drag-producing aerodynamic fins.

It will be appreciated that many modifications and variations of the present invention are possible in the light of the above teachings. For example, the spherical bearing surface may be located outside the rotatable plug, i.e., with the plug carrying an axially extending shaft which terminates in a spherical bearing and with the rocket insert having a housing to receive the spherical bearing. Also, alternate methods of spinning up the plug such as by means of a compressed air-driven rotor may be substituted for the means described, and the vanes 27 may be formed by grooves having sides which taper outward to more effectively intercept combustion gases or other fluid.

What is claimed is:

1. An attitude-correcting system for a space vehicle subject to attitude deviations comprising, in combination,
   means in said vehicle for providing a flow of gas in a nozzle exit area on the order of thousands of f.p.s.;
   means in said vehicle for directing flow of said gas into a plenum having a single exit area;
   a gyroscopic plug nozzle positioned upstream of and extending into said exit area for reducing flow through one portion of said area during attitude deviation of said vehicle and increasing flow through the opposite portion thereof so that an attitude-corrective force is produced by said increased flow;
   said plug nozzle and said vehicle including means for offsetting the unbalanced forces applied to the plug nozzle during attitude deviation by the unbalanced flow of gases past the plug nozzle,
   said means for directing flow into said plenum including a plurality of passages centrally disposed in relation to the longitudinal axis of said vehicle so as to direct flow against that portion of the upper surface of said plug nozzle nearest the flow directing means when the rocket is in a deviated attitude to create a balancing moment opposing the upsetting moment caused by the unequal flow of gases past said plug nozzle.

2. The system as defined in claim 1 and further including a plurality of vanes attached to and circumferentially spaced about the upper surface of said plug nozzle,
   said vanes disposed in the path of exhaust gases and mounted at an obtuse angle to the flow of propellant gas so as to create a tangential force which augments nozzle spin and an orbital force which opposes said upsetting moment.

3. An attitude-correcting system for a space vehicle subject to attitude deviations comprising, in combination,
   means in said vehicle for providing a flow of gas in a nozzle exit area on the order of thousands of f.p.s.;
   means in said vehicle for directing flow of said gas into a plenum having a single exit area;
   a gyroscopic plug nozzle positioned upstream of and extending into said exit area for reducing flow through one portion of said area during attitude deviation of said vehicle and increasing flow through the opposite portion thereof so that an attitude-corrective force is produced by said increased flow;
   said plug nozzle and said vehicle including means for offsetting the unbalanced forces applied to the plug nozzle during attitude deviation by the unbalanced flow of gases past the plug nozzle; and
   said plug nozzle adapted to be spun up by a power source external to the space vehicle;
   said plug nozzle including means for detachably receiving aligning means; and
   aligning means at the launch site for providing a gyroscopic reference axis upon said plug nozzle being spun up to a selected rotational velocity;
   said plug nozzle secured to said means for directing flow by a connective means having selected flexibility so that the upsetting forces caused by said unbalanced flow of gases additionally flexes said connective means, creating an offsetting increment of force at the base thereof which opposes and cancels the upsetting force.

4. A directional control system for maintaining a space vehicle having at least one rocket engine in an attitude determined at launch comprising
   a throat area defined by said rocket engine and a gyroscopic plug nozzle disposed at least partially within said throat area with its external wall spaced radially inwardly from the internal wall of said throat area to form therewith an annular opening for exhaust of propellant gas from said rocket engine; and
   means carried by said rocket engine for supporting said plug nozzle for rotation about a gyroscopic axis normally coincident with the longitudinal axis of said space vehicle,
   said means adapted to flex upon disalignment of said longitudinal axis and said gyroscopic axis,
   said disalignment of axes causing enlarging of said opening in the direction toward which the forward end of said space vehicle has deviated, thereby enlarging the exhaust and consequently augmenting the thrust at that side to provide a resultant correcting moment correcting the deviation of said space vehicle, whereby said augmented thrust causes unbalanced forces to be applied to said plug nozzle, which forces are opposed and balanced by said means adapted to flex upon disalignment of said axes.

5. The system as defined in claim 4 wherein said means for supporting said plug nozzle includes a resilient connecting member and a cylinder closed at one end,
   said connecting member secured at one end to said rocket engine and at its other end to the inner surface of the closed end of said cylinder,
   said cylinder rotatable within said plug nozzle, whereby the unbalanced forces occurring during deviation correction apply an additional force at said other end of said connecting member substantially transverse to said gyroscopic axis, which force is opposed and balanced by the unflexing force of said connecting member.

6. The system as defined in claim 5 wherein said cylinder is suspended in a cavity in said plug nozzle from one race of a bearing, the other race of which is secured to said plug nozzle.

7. The system as defined in claim 6 wherein said connecting member is a metal rod,
   said metal rod having sufficient resiliency to absorb said disalignment and unbalanced forces while bending within the limits of the open end of said cylinder.

8. The system as defined in claim 7 wherein said plug nozzle is adapted to be spun up by a power source external to the space vehicle,
   said plug nozzle including means for detachably receiving aligning means; and
   aligning means at the launch site for providing a gyroscope reference axis upon said plug nozzle being spun up to a selected rotational velocity.

* * * * *